(12) United States Patent
Mizuhara et al.

(10) Patent No.: US 10,505,196 B2
(45) Date of Patent: Dec. 10, 2019

(54) SOLID OXIDE FUEL CELL AND METHOD FOR PRODUCING ELECTROLYTE LAYER-ANODE ASSEMBLY

(71) Applicant: SUMITOMO ELECTRIC INDUSTRIES, LTD., Osaka-shi, Osaka (JP)

(72) Inventors: Naho Mizuhara, Itami (JP); Masatoshi Majima, Itami (JP); Hiromasa Tawarayama, Itami (JP); Chihiro Hiraiwa, Itami (JP); Takahiro Higashino, Itami (JP); Yohei Noda, Itami (JP); Kazunari Miyamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/742,939

(22) PCT Filed: Jul. 15, 2016

(86) PCT No.: PCT/JP2016/003368
§ 371 (c)(1),
(2) Date: Jan. 9, 2018

(87) PCT Pub. No.: WO2017/013868
PCT Pub. Date: Jan. 26, 2017

(65) Prior Publication Data
US 2019/0006680 A1    Jan. 3, 2019

(30) Foreign Application Priority Data

Jul. 17, 2015 (JP) .................. 2015-143013

(51) Int. Cl.
*H01M 8/12* (2016.01)
*H01M 4/86* (2006.01)
(Continued)

(52) U.S. Cl.
CPC .......... *H01M 4/8621* (2013.01); *H01M 4/86* (2013.01); *H01M 4/9033* (2013.01);
(Continued)

(58) Field of Classification Search
CPC ............ H01M 4/8621; H01M 8/1246; H01M 8/04201; H01M 4/9066; H01M 4/9033;
(Continued)

(56) References Cited

U.S. PATENT DOCUMENTS

2012/0003565 A1    1/2012  Son et al.

FOREIGN PATENT DOCUMENTS

JP    2012-520553 A    9/2012
JP    2012-212541 A    11/2012

OTHER PUBLICATIONS

Mirab, Optimizing the manufacturing method of half-cell fuel cell based on solid electrolyte with hydrogen ion conductivity, Iranica Journal of Energy & Environment 3(4), 341-346, 2012. (Year: 2012).*

* cited by examiner

*Primary Examiner* — Cynthia K Walls
(74) *Attorney, Agent, or Firm* — Drinker Biddle & Reath LLP (57) ABSTRACT

In an SOFC, a solid electrolyte layer and an anode are integrated with each other to provide an electrolyte layer-anode assembly. The anode contains a nickel element and a first proton conductor. The first proton conductor is composed of a first perovskite oxide having proton conductivity. The first perovskite oxide has an $AXO_3$-type crystal struc-
(Continued)

ture, the A-site containing Ba, the X-site containing Y and at least one selected from the group consisting of Zr and Ce. The nickel element is at least partially in the form of NiO. The anode has a porosity $P_a$ of 10% or more by volume when $I_{Ni}/I_{NiO} \leq 0.1$, where $I_{Ni}/I_{NiO}$ denotes a relative intensity ratio of the peak intensity $I_{Ni}$ of metallic Ni to the peak intensity $I_{NiO}$ of the NiO in an XRD spectrum of the anode.

6 Claims, 1 Drawing Sheet

(51) Int. Cl.
*H01M 8/02* (2016.01)
*H01M 4/90* (2006.01)
*H01M 8/04082* (2016.01)
*H01M 8/1246* (2016.01)
*H01M 8/124* (2016.01)

(52) U.S. Cl.
CPC ............ *H01M 4/9066* (2013.01); *H01M 8/02* (2013.01); *H01M 8/04201* (2013.01); *H01M 8/12* (2013.01); *H01M 8/1246* (2013.01); H01M 2004/8684 (2013.01); H01M 2008/1293 (2013.01); *Y02E 60/525* (2013.01); *Y02P 70/56* (2015.11)

(58) Field of Classification Search
CPC ............ H01M 8/12; H01M 8/02; H01M 4/86; H01M 2008/1293; H01M 2004/8684; Y02E 60/525; Y02P 70/56
See application file for complete search history.

SOLID OXIDE FUEL CELL AND METHOD FOR PRODUCING ELECTROLYTE LAYER-ANODE ASSEMBLY

TECHNICAL FIELD

The present invention relates to a solid oxide fuel cell including an anode-supported solid electrolyte layer, and more particularly, to the improvement of an electrolyte layer-electrode assembly therein.

BACKGROUND ART

Solid oxide fuel cells (SOFCs) include a porous cathode, a porous anode, and a cell structure including a dense solid electrolyte layer provided therebetween, an oxidant channel to supply an oxidant to the cathode, and a fuel channel to supply a fuel to the anode. In currently available SOFCs, an oxygen-ion conductive metal oxide such as yttria-stabilized zirconia (YSZ) as a typical example is used as a solid electrolyte. To improve power generation characteristics of SOFCs, the thickness of the solid electrolyte layer is preferably minimized. Thus, an electrolyte layer-electrode assembly including a solid electrolyte layer arranged on a cathode or an anode having enhanced mechanical strength is used in some cases. Such an assembly is referred to as a cathode-supported solid electrolyte layer or an anode-supported solid electrolyte layer.

The anode-supported solid electrolyte layer is generally produced by forming a coating film containing a solid electrolyte on a surface of the green body of a mixture of a nickel component (such as NiO) serving as a hydrogen dissociation catalyst and a solid electrolyte serving as an oxygen-ion conductor and sintering (co-sintering) the resulting component. The anode produced in this way is initially dense. However, when the anode is used in an SOFC, NiO is reduced to Ni by hydrogen serving as fuel supplied to the anode, and the anode is changed into a porous anode by volumetric shrinkage occurring simultaneously with the reduction.

PTL 1 reports that in an anode-supported solid electrolyte layer containing an oxide ionic conductor such as YSZ, the size of pores in the anode is adjusted from the viewpoint of improving the economic efficiency of an SOFC for large-scale power generation and stabilizing a solid electrolyte layer.

PTL 2 reports that in an anode-supported solid electrolyte layer, porosity is adjusted in such a manner that the anode has sufficient strength and a fuel gas flows easily. In PTL 2, a solid electrolyte such as YSZ, which is an ion-conductive oxide, is used for the anode, and a pore-forming material is used in order to form the porous anode prior to the reduction of NiO.

The operating temperature of an SOFC containing oxygen-ion conductive YSZ serving as an electrolyte is about 750° C. to about 1,000° C. at present, and an expensive oxidation-resistant material is used in a component. Thus, there is a need for the development of an SOFC that operates an intermediate temperature range of 400° C. to 600° C., in which inexpensive general-purpose stainless steel can be used. Perovskite oxides such as $BaCe_{0.8}Y_{0.2}O_{2.9}$ (BCY) and $BaZr_{0.8}Y_{0.2}O_{2.9}$ (BZY) exhibit high proton conductivity in the intermediate temperature range and thus are promising solid electrolytes for intermediate-temperature type fuel cells.

CITATION LIST

Patent Literature

PTL 1: Japanese Unexamined Patent Application Publication No. 2012-520553
PTL 2: Japanese Unexamined Patent Application Publication No. 2012-212541

SUMMARY OF INVENTION

Technical Problem

In the case where an anode of an anode-supported solid electrolyte layer is produced with a mixture containing a nickel component, YSZ, and a pore-forming material, the disappearance of the pore-forming material by heating forms pores, and the co-sintering of NiO and YSZ proceeds by sintering to form a porous anode. To allow the co-sintering to proceed, heating at a high temperature such as 1,400° C. is required. The nickel component and YSZ do not react at such a temperature; thus, the pores can be easily formed in the anode.

However, when BCY or BZY, which is a proton conductor, and the nickel component are fired, both are reacted together to form $Y_2BaNiO_5$. The product is in a liquid phase at the sintering temperature. The formation of such a liquid-phase component during the sintering promotes the sintering of the anode, resulting in a high shrinkage rate. Thus, although pores are temporarily formed by using the pore-forming material, pores are decreased while sintering proceeds, thereby causing a significantly low porosity of the anode. A low porosity of the anode decreases the fuel utilization efficiency.

It is an object of the present invention to provide a solid oxide fuel cell including a high-porosity anode even when a perovskite oxide containing Ba and Y is contained, and a method for producing an electrolyte layer-anode assembly.

Solution to Problem

One aspect of the present invention is directed to providing a solid oxide fuel cell including a cell structure including a cathode, an anode, a protonically conductive solid electrolyte layer provided between the cathode and the anode, an oxidant channel to supply an oxidant to the cathode, and a fuel channel to supply a fuel to the anode, in which the solid electrolyte layer and the anode are integrated with each other to provide an electrolyte layer-anode assembly, the anode contains a nickel element and a first proton conductor, the first proton conductor is composed of a first perovskite oxide having proton conductivity, the first perovskite oxide has an $AXO_3$-type crystal structure, the A-site containing Ba, the X-site containing Y and at least one selected from the group consisting of Zr and Ce, the nickel element is at least partially in the form of NiO, and the anode has a porosity $P_a$ of 10% or more by volume when $I_{Ni}/I_{NiO} \leq 0.1$, where $I_{Ni}/I_{NiO}$ denotes a relative intensity ratio of the peak intensity $I_{Ni}$ of metallic Ni to the peak intensity $I_{NiO}$ of the NiO in an X-ray diffraction (XRD) spectrum of the anode.

Another aspect of the present invention is directed to providing a method for producing an electrolyte layer-anode assembly, the method including:

a step A of forming a mixture containing a nickel component, a first proton conductor, and a pore-forming material into a green body having a sheet-like shape;

a step B1 of applying a paste containing a second proton conductor to one main surface of the green body to form a coating film b1, and;

a step C of sintering the green body at 1,200° C. to 1,350° C. to form an anode from the green body, to form a solid electrolyte layer from the coating film b1, and to integrate the anode and the solid electrolyte layer into an electrolyte layer-anode assembly, in which the first proton conductor is composed of a first perovskite oxide having proton conductivity, the first perovskite oxide has an $AXO_3$-type crystal structure, the A-site containing Ba, the X-site containing Y and at least one selected from the group consisting of Zr and Ce, a nickel element contained in the nickel component of the anode is at least partially in the form of NiO, and the anode has a porosity $P_a$ of 10% or more by volume when $I_{Ni}/I_{NiO} \leq 0.1$, where $I_{Ni}/I_{NiO}$ denotes a relative intensity ratio of the peak intensity $I_{Ni}$ of metallic Ni to the peak intensity $I_{NiO}$ of the NiO in an XRD spectrum of the anode.

Advantageous Effects of Invention

According to the present invention, even when the anode contains the perovskite oxide containing Ba and Y, the anode of the anode-supported solid electrolyte layer (or the electrolyte layer-anode assembly) of the SOFC can have an increased porosity.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Description of Embodiments of Invention

Embodiments of the present invention are first listed and explained.

An SOFC according to an embodiment of the present invention includes a cell structure including a cathode, an anode, a protonically conductive solid electrolyte layer provided between the cathode and the anode, an oxidant channel to supply an oxidant to the cathode, and a fuel channel to supply a fuel to the anode. The solid electrolyte layer and the anode are integrated with each other to provide an electrolyte layer-anode assembly. The anode contains a nickel element and a first proton conductor. The first proton conductor is composed of a first perovskite oxide having proton conductivity. The first perovskite oxide has an $AXO_3$-type crystal structure, the A-site containing Ba, the X-site containing Y and at least one selected from the group consisting of Zr and Ce. The nickel element is at least partially in the form of NiO. The anode has a porosity $P_a$ of 10% or more by volume when $I_{Ni}/I_{NiO} \leq 0.1$, where $I_{Ni}/I_{NiO}$ denotes the relative intensity ratio of the peak intensity $I_{Ni}$ of metallic Ni to the peak intensity $I_{NiO}$ of the NiO in the XRD spectrum of the anode.

Another embodiment of the present invention is directed to providing a method for producing an electrolyte layer-anode assembly, the method including a step A of forming a mixture containing a nickel component, a first proton conductor, and a pore-forming material into a green body having a sheet-like shape, a step B1 of applying a paste containing a second proton conductor to one main surface of the green body to form a coating film b1, and a step C of sintering the green body including the coating film b1 obtained in the step B1 at 1,200° C. to 1,350° C. to form an anode from the green body, to form a solid electrolyte layer from the coating film b1, and to integrate the anode and the solid electrolyte layer into an electrolyte layer-anode assembly. The first proton conductor contains a first perovskite oxide having proton conductivity. The first perovskite oxide has an $AXO_3$-type crystal structure, the A-site containing Ba, the X-site containing Y and at least one selected from the group consisting of Zr and Ce. In the anode, the nickel element is at least partially in the form of NiO. The anode has a porosity $P_a$ of 10% or more by volume when $I_{Ni}/I_{NiO} \leq 0.1$, where $I_{Ni}/I_{NiO}$ denotes the relative intensity ratio of the peak intensity $I_{Ni}$ of metallic Ni to the peak intensity $I_{NiO}$ of the NiO in the XRD spectrum of the anode.

In general, the anode of an electrolyte layer-anode assembly is formed by sintering a nickel component and a proton conductor. To increase the porosity of the anode, it is advantageous to fire a mixture containing a pore-forming material in addition to the nickel component and the proton conductor. The pore-forming material is eliminated by heating in the course of the production of the anode, thereby forming pores in the anode.

An example of a proton conductor that can allow an SOFC to operate in an intermediate temperature range of 400° C. to 600° C. is a perovskite oxide containing Ba and Y, such as the first proton conductor. If an SOFC can operate in the intermediate temperature range, the oxidation of a metal component in a battery is inhibited; thus, an increase in internal resistance can be inhibited to prolong the life of the battery.

However, in the case where the perovskite oxide as described above is used for the production of an anode, a proton conductor and a nickel component are reacted to form $Y_2BaNiO_5$ during sintering. This product is in a liquid phase at the sintering temperature. The presence of such a product promotes co-sintering to increase the shrinkage rate of a sintered product. Thus, although pores are temporarily formed by using a pore-forming material, sintering proceeds to decrease the pores, thereby causing a significantly low porosity. That is, the use of the perovskite oxide as described above makes it difficult to increase the porosity of the anode even if the pore-forming material is used. The electrolyte layer-anode assembly is formed during the sintering step in a state in which the solid electrolyte layer is integrated with the anode. Thus, an excessively high shrinkage rate of the anode may result in an excessively large difference in shrinkage rate between the solid electrolyte layer and the anode to cause warpage.

To increase the porosity of the anode, it is conceivable that sintering will be performed at a low temperature in such a manner that $Y_2BaNiO_5$ is not formed. However, the co-sintering of the nickel component and the proton conductor does not easily proceed, and furthermore, the sintering of the solid electrolyte layer is insufficient. Thus, the solid electrolyte layer has the excessively high porosity, and the fuel and the oxidant leak, thereby degrading the power generation performance of the SOFC.

In the foregoing embodiment, when the electrolyte layer-anode assembly is formed, the pore-forming material is used, and the sintering temperature is 1,200° C. to 1,350° C. Thus, even though the anode contains the first proton conductor, it is possible to increase the porosity $P_a$ of the anode to 10% or more by volume when $I_{Ni}/I_{NiO} \leq 0.1$, where $I_{Ni}/I_{NiO}$ represents the relative intensity ratio in the XRD spectrum of the anode of the electrolyte layer-anode assembly. This can increase the fuel utilization efficiency. Furthermore, the sintering at the temperature described above can allow the sintering of the solid electrolyte layer to proceed sufficiently. Thus, a dense solid electrolyte layer is easily obtained, and it is also possible to inhibit the leakage of the fuel or the oxidant.

The anode contains at least NiO. NiO is reduced to metallic Ni during power generation to form pores at portions of the anode from which oxygen is removed. Thus, in theory, a longer generating time results in a higher porosity of the anode until NiO in the anode is totally consumed. When the relative intensity ratio $I_{Ni}/I_{NiO}$ is within the range as described above, the anode contains a large amount of NiO, and it can be said that the SOFC is in the initial state (or in a state close thereto). The high porosity $P_a$ of the anode of the SOFC in the initial state as described above can result in the increased efficiency of the cell reaction even in the initial stage.

The relative intensity ratio, $I_{Ni}/I_{NiO}$, of the peak intensity $I_{Ni}$ of metallic Ni to the peak intensity $I_{NiO}$ of Ni can be determined as described below. In the XRD spectrum of the anode, the intensity $I_{Ni}$ of the peak of metallic Ni corresponding to a lattice spacing d of 2.034 Å in database No. 00-004-0850 of JCPDS and the intensity $I_{NiO}$ of the peak of NiO corresponding to a lattice spacing d of 2.089 Å in database No. 00-047-1049 of JCPDS are determined. The relative intensity ratio $I_{Ni}/I_{NiO}$ can be determined by dividing the peak intensity $I_{Ni}$ of metallic Ni by the peak intensity $I_{NiO}$ of NiO.

The porosity $P_a$ is preferably 10% by volume to 25% by volume. When the porosity $P_a$ is within this range, the fuel utilization efficiency can be further increased.

In a preferred embodiment, the solid electrolyte layer contains a second proton conductor. The second proton conductor is composed of a second perovskite oxide having proton conductivity. The second perovskite oxide has an $AXO_3$-type crystal structure, the A-site containing Ba, the X-site containing Y and at least one selected from the group consisting of Zr and Ce. In the case where the first proton conductor contained in the anode and the second proton conductor contained in the solid electrolyte layer are identical or similar to each other, high adhesion between the anode and the solid electrolyte layer is easily obtained. The difference in shrinkage rate during the sintering between the anode and the solid electrolyte layer can be reduced, thus easily inhibiting the occurrence of warpage of the assembly.

The solid electrolyte layer preferably has a porosity $P_s$ of 3% or less by volume. When the sintering temperature is the foregoing temperature, the anode can have an increased porosity $P_a$, and the low porosity $P_s$ can be obtained as described above. When the porosity $P_s$ is within this range, the leakage of the fuel and the oxidant from the solid electrolyte layer can be further inhibited.

Preferably, the electrolyte layer-anode assembly further includes an intermediate layer provided between the solid electrolyte layer and the anode, the intermediate layer contains a nickel element and a third proton conductor, and the intermediate layer has a porosity $P_i$ lower than the porosity $P_a$. The porosity $P_i$ is preferably 5% or less by volume. The formation of the intermediate layer can reduce the difference in shrinkage rate between the anode and the solid electrolyte layer to reduce the stress, thus further inhibiting the leakage of the fuel or the oxidant.

The porosities $P_s$ and $P_i$ are porosities of the solid electrolyte layer and the intermediate layer measured when the porosity $P_a$ of the anode is measured. That is, the porosities $P_s$ and $P_i$ are porosities of the solid electrolyte layer and the intermediate layer when $I_{Ni}/I_{NiO} \leq 0.1$ in the anode.

In an preferred embodiment, the third proton conductor is composed of a third perovskite oxide having proton conductivity, and the third proton conductor has an $AXO_3$-type crystal structure, the A-site containing Ba, the X-site containing Y and at least one selected from the group consisting of Zr and Ce. In the case where the third proton conductor contained in the intermediate layer, the first proton conductor contained in the anode, and the second proton conductor contained in the solid electrolyte layer are identical or similar to one another, high adhesion between the anode and the solid electrolyte layer is easily obtained. The difference in shrinkage rate during the sintering among the anode, the intermediate layer, and the solid electrolyte layer can be reduced, thus easily inhibiting the occurrence of warpage of the assembly.

Preferably, the method for producing an electrolyte layer-anode assembly further includes before the step B1, a step B2 of applying a paste containing a nickel element and the third proton conductor to one main surface of the green body obtained in the step A to form a coating film b2. In this case, in the step B1, the coating film b1 is formed on an exposed surface of the coating film b2 obtained in the step B2, and in the step C, the intermediate layer provided between the anode and the solid electrolyte layer is formed from the coating film b2. The intermediate layer has a porosity $P_i$ lower than the porosity $P_a$. The assembly includes the intermediate layer; thus, the leakage of the fuel and the oxidant can be further inhibited to increase the open-circuit voltage of the fuel cell.

In the step C, the sintering temperature is preferably 1,250° C. to 1,350° C. In this temperature range, the degree of sintering of the anode can be increased to increase the conductivity.

In the case where the pore-forming material is a carbonaceous pore-forming material, in the step A, the amount of the pore-forming material is preferably 10 parts by mass to 30 parts by mass of the solid content contained in the mixture. In this case, it is possible to more easily obtain a high porosity of the anode.

Details of Embodiments of Invention

Specific examples of SOFCs according to embodiments of the present invention will be described below with appropriate reference to the drawings. The present invention is not limited to these examples. The present invention is indicated by the appended claims. It is intended to include any modifications within the scope and meaning equivalent to the scope of the claims.

[SOFC]

An SOFC includes a cell structure, an oxidant channel, and a fuel channel. The components will be described in more detail below. The SOFC according to an embodiment is useful as a protonic ceramic fuel cell (PCFC).

(Cell Structure)

The cell structure includes a cathode, an anode, and a solid electrolyte layer provided therebetween. The solid electrolyte layer and the anode are integrated with each other to provide an electrolyte layer-anode assembly.

(Electrolyte Layer-Anode Assembly)

(Anode)

The anode contains a nickel element and a first proton conductor. The anode has a porous structure. At the anode, a reaction (an oxidation reaction of fuel) occurs in which a fuel such as hydrogen introduced from a channel, described below, is oxidized to form protons and electrons.

The nickel element is at least partially in the form of NiO. That is, the anode contains the nickel element that is at least partially in the form of NiO. In the anode, NiO is reduced to metallic Ni during the power generation of the SOFC. Thus, the nickel element may be at least partially contained in the anode in the form of metallic Ni. The metallic Ni content of the anode varies, depending on the usage state of the SOFC. The anode does not necessarily contain metallic Ni. However, metallic Ni may be incorporated when the anode is produced, as needed.

As the first proton conductor, a first perovskite oxide having proton conductivity is used.

In general, a perovskite oxide has an $AXO_3$-type crystal structure. The $AXO_3$-type crystal structure indicates a crystal structure similar to that of $CaTiO_3$. The A-site is occupied by an element having an ionic radius larger than an element that occupies the X-site.

In the first perovskite oxide, the A-site contains Ba, and the X-site contains Y and at least one selected from the group consisting of Zr and Ce. The proportion of Ba in the A-site is preferably 90 atomic percent or more, more preferably 95 atomic percent or more.

Specific examples of the first perovskite oxide include $BaZr_{1-x1}Y_{x1}O_{3\pm\delta}$ (BZY, $0<x1\leq0.5$), $BaCe_{1-x2}Y_{x2}O_{3\pm\delta}$ (BCY, $0<x2\leq0.5$), and $BaZr_{1-x3-y1}Ce_{x3}Y_{y1}O_{3\pm\delta}$ (BZCY, $0.5\leq x3<1$, and $0<y1<0.5$). These oxides may be used alone or in combination of two or more. Although the proportion of Ba in each formula is expressed as 1 (i.e., a proportion of Ba in the A-site of 100 atomic percent), the proportion of Ba in the A-site is not limited thereto and may be within the range described above. Ce, Zr, and/or Y that occupy the X-site may be partially replaced with another element (for example, another lanthanoid element. The proportion of another element that occupies the X-site is, for example, 20 atomic percent or less, preferably 10 atomic percent or less. δ is excess oxygen or an oxygen vacancy concentration and may be $0\leq\delta\leq0.15$ or $0\leq\delta\leq0.11$.

Although the anode may contain a proton conductor (a fourth proton conductor) other than the first proton conductor, the amount of the fourth proton conductor is preferably minimized because the advantages of the present invention are easily obtained. Among known proton conductors used for SOFCs, a proton conductor other than the first proton conductor is used as the fourth proton conductor. The amount of the first proton conductor in the anode is preferably 90% or more by mass and may be 95% or more by mass of the total of the proton conductors contained in the anode. As the proton conductor contained in the anode, only the first proton conductor may be used.

The anode of the SOFC according to the embodiment has a high porosity regardless of the use of the first perovskite oxide. The porosity $P_a$ of the anode is 10% or more by volume, preferably 10% by volume to 30% by volume or 10% by volume to 25% by volume, and may be 10% by volume to 20% by volume. When the porosity $P_a$ is within this range, the fuel utilization efficiency can be increased. However, the porosity of the anode varies, depending on the degree of the progression of power generation. Thus, the porosity $P_a$ is a value in the initial state of the SOFC, specifically, when in the XRD spectrum of the anode, $I_{Ni}/I_{NiO}\leq0.1$, where $I_{Ni}/I_{NiO}$ represents the relative intensity ratio of the peak intensity $I_{Ni}$ of metallic Ni to the peak intensity $I_{NiO}$ of NiO.

The thickness of the anode can be appropriately selected from, for example, 10 μm to 2 mm. The anode has a function as a support that supports the solid electrolyte layer; thus, the thickness thereof is preferably 100 μm to 2 mm.

When a gas containing a gas such as ammonia, methane, or propane, which is decomposed to form hydrogen, is introduced into the anode, the gas is decomposed at the anode to generate hydrogen. For example, hydrogen generated by the decomposition of ammonia is oxidized at the anode to form protons. The formed protons migrate through the solid electrolyte layer to the cathode. $N_2$ formed simultaneously by the decomposition of ammonia is ejected as an exhaust gas from a fuel gas outlet described below. The anode may contain a catalyst having the function of decomposing the gas. An example of the catalyst having the function of decomposing a gas such as ammonia is a compound containing at least one catalytic component selected from the group consisting of Fe, Co, Ti, Mo, W, Mn, Ru, and Cu.

(Solid Electrolyte Layer)

The solid electrolyte layer is held between the cathode and the anode in the cell structure.

The solid electrolyte layer is not particularly limited as long as it has proton conductivity. Usually, the solid electrolyte layer contains a proton conductor. From the viewpoint of enhancing the adhesion between the solid electrolyte layer and the anode, the solid electrolyte layer preferably contains a second perovskite oxide (second proton conductor) having proton conductivity. Preferably, the second perovskite oxide has an $AXO_3$-type crystal structure as described above, the A-site containing Ba, the X-site containing Y and at least one selected from the group consisting of Zr and Ce. The second perovskite oxide can be appropriately selected from those exemplified for the first perovskite oxide. The second perovskite oxide is also effective in inhibiting the warpage of the occurrence of the electrolyte layer-anode assembly.

The solid electrolyte layer may contain another solid electrolyte and a proton conductor other than the second proton conductor. As the another solid electrolyte, a solid electrolyte having no proton conductivity is also included. However, from the viewpoint of easily performing operation in the intermediate temperature range and enhancing adhesion to the anode, 50% or more by mass or 70% or more by mass of the solid electrolyte layer is preferably composed of the second proton conductor.

From the viewpoint of inhibiting the leakage of the fuel or the oxidant, the porosity $P_s$ of the solid electrolyte layer is preferably minimized. The solid electrolyte layer preferably has a porosity $P_s$ of, for example, 3% or less by volume, more preferably 1% or less by volume. In this embodiment, the solid electrolyte layer and the anode are formed by sintering to provide the electrolyte layer-anode assembly in which these are integrated with each other, and it is possible to provide the anode having a high porosity $P_a$ and the solid electrolyte layer having a low porosity $P_s$. From the viewpoint of easily inhibiting the occurrence of warpage by the relaxation of stress during the sintering, preferably, $P_s<P_t$.

The solid electrolyte layer has a thickness of, for example, 1 μm to 50 μm, preferably 3 μm to 20 μm. When the thickness of the solid electrolyte layer is within this range, the solid electrolyte layer has a low resistance, which is preferred.

(Intermediate Layer)

The electrolyte layer-anode assembly may further include an intermediate layer provided between the solid electrolyte layer and the anode, as needed. In this case, the intermediate layer is integrated with the solid electrolyte layer and the anode to provide the electrolyte layer-anode assembly.

The intermediate layer contains a nickel element and a proton conductor. As with the anode, the nickel element functions as a catalyst also in the intermediate layer. In the intermediate layer, preferably, the nickel element is at least partially in the form of NiO. Also in the intermediate layer, NiO is reduced to metallic Ni during the power generation of the SOFC. The nickel element may be partially contained in the anode in the form of metallic Ni.

As the proton conductor, a third perovskite oxide (third proton conductor) having proton conductivity is preferably used. The third perovskite oxide also has an $AXO_3$-crystal structure as described above, the A-site containing Ba, the X-site containing Y and at least one selected from the group consisting of Zr and Ce. The third perovskite oxide can be appropriately selected from those exemplified for the first perovskite oxide. When the intermediate layer contains the third proton conductor, it is possible to enhance the adhesion between the solid electrolyte layer and the intermediate layer and the adhesion between the intermediate layer and the anode. The use of the third proton conductor facilitates to inhibit the occurrence of warpage of the electrolyte layer-anode assembly.

The intermediate layer may contain another solid electrolyte and a proton conductor other than the third proton conductor. As the another solid electrolyte, a solid electrolyte having no proton conductivity is also included. However, from the viewpoint of easily performing operation in the intermediate temperature range and enhancing adhesion to the anode, 50% or more by mass or 70% or more by mass of the solid electrolyte intermediate layer is preferably composed of the third proton conductor.

The difference between the intermediate layer and the anode is a difference in terms of porosity. The porosity $P_i$ of the intermediate layer is preferably lower than the porosity $P_a$ of the anode. When $P_i < P_a$, a high fuel utilization efficiency can be ensured at the anode, and the leakage of the fuel and the oxidant is easily inhibited at the intermediate layer on the side of the solid electrolyte layer. $P_i$ may be less than 10% by volume, preferably 5% or less by volume, and may be 3% or less by volume. When $P_i$ is within this range, the effect of inhibiting the leakage of the fuel and the oxidant can be further enhanced.

The intermediate layer has a thickness of, for example, 0.5 μm to 10 μm, preferably 1 μm to 5 μm. When the thickness of the intermediate layer is within this range, the high porosity of the anode is easily and effectively used while the leakage of the fuel and the oxidant is inhibited.

Each of the anode, the solid electrolyte layer, and the intermediate layer may be formed of a single layer or a multiple layers.

(Method for Producing Electrolyte Layer-Anode Assembly)

The electrolyte layer-anode assembly can be produced through a step A of a mixture containing a nickel component, the first proton conductor, and a pore-forming material into a green body having a sheet-like shape, a step B1 of applying a paste containing the second proton conductor to one main surface of the green body to form a coating film b1, and, a step C of sintering the green body including the coating film b1 obtained in the step B1 at 1,200° C. to 1,350° C. to form an anode from the green body, to form a solid electrolyte layer from the coating film b1, and to integrate the anode and the solid electrolyte layer into an electrolyte layer-anode assembly.

As described above, in order to provide the anode that contains the first proton conductor and that has a high porosity $P_a$ of 10% or more by volume, it is important that the sintering temperature in the step C be 1,200° C. to 1,350° C. When the sintering temperature is within this range, the shrinkage and disappearance of pores can be inhibited to ensure a high porosity regardless of the use of the first proton conductor.

In the case where the intermediate layer is formed, the method for producing an electrolyte layer-anode assembly further includes before the step B1, a step B2 of applying a paste containing a nickel element and the third proton conductor to one main surface of the green body obtained in the step A to form a coating film b2. In this case, in the step B1, the coating film b1 is formed on an exposed surface of the coating film b2 obtained in the step B2, and in the step C, the intermediate layer provided between the anode and the solid electrolyte layer is formed from the coating film b2.

Each step will be described in more detail below.

(Step A)

In the step A, a green body corresponding to a precursor of the anode is formed with the mixture containing the nickel component, the first proton conductor, and the pore-forming material. The mixing of the components and the molding of the mixture can be performed by known methods. The shape of the green body can be appropriately selected, depending on the SOFC, and is a sheet-like shape (or a plate-like shape).

In the step A, the mixture may be granulated, as needed, and the granulated mixture may be formed. If necessary, the granulated mixture may be subjected to pulverization treatment, and the pulverized mixture may be formed. In the step A, the green body may be dried, as needed.

Examples of the nickel component that can be used include hydroxide, salts (e.g., inorganic acid salts such as carbonates), and halides. Preferably, nickel oxides such as a nickel oxide (NiO) are used. As the nickel component, a single nickel component may be used alone. Alternatively, two or more nickel components may be used in combination. In the formed anode, a nickel element originating from the nickel component is at least partially in the form of NiO. In the anode, the nickel element originating from the nickel component may be partially in the form of metallic Ni.

In the mixture, the volume ratio of the nickel component to the first proton conductor (=nickel component/first proton conductor) can be selected from the range of, for example, 40/60 to 80/20, preferably 50/50 to 75/25. When the volume ratio is within this range, high power generation performance is easily ensured, and the degree of sintering is easily increased in the step C.

The pore-forming material is not particularly limited as long as it can be decomposed by heating to form pores in the anode. Known pore-forming materials used for SOFCs can be used. Examples of the pore-forming material include carbonaceous pore-forming materials and organic pore-forming materials. The shape of the pore-forming material is not particularly limited, and the pore-forming material having, for example, a granular or fibrous shape is used.

In the case of using the granular pore-forming material, the average particle size is, for example, 1 μm to 30 μm, preferably 5 μm to 25 μm. The term "average particle size" refers to a median diameter ($D_{50}$) of a particle size distribution on a volume basis. In the case of using the fibrous pore-forming material, the average fiber diameter is, for example, 10 nm to 3 μm, preferably 100 nm to 1 μm. The average fiber length of the pore-forming material is, for example, 1 μm to 15 μm, preferably 5 μm to 10 μm. When the average particle size, the average fiber diameter, and the average fiber length are within these ranges, the pores having an appropriate size can be formed, and the excessive shrinkage of the pores during sintering is easily inhibited.

Examples of the carbonaceous pore-forming material include carbon particles such as graphite and carbon black, and carbon fibers such as carbon nanofibers. Examples of the organic pore-forming material include particles and fibers of organic polymers. Examples of organic polymers include synthetic resins such as acrylic resins, and natural polymers such as starch, e.g., corn starch. These pore-forming materials may be used alone or in combination of two or more.

In the step A, the amount of the pore-forming material may be selected in the range of, for example, 10 parts by mass to 50 parts by mass or 10 parts by mass to 40 parts by mass based on 100 parts by mass of the total amount of the nickel component and the first proton conductor. In the case of using the carbonaceous pore-forming material, the amount thereof is preferably 10 parts by mass to 30 parts by mass, more preferably 13 parts by mass to 25 parts by mass, or 15 parts by mass to 20 parts by mass based on 100 parts by mass of the total amount of the nickel component and the first proton conductor. In the case of using the organic pore-forming material, the amount thereof is preferably 15 parts by mass to 40 parts by mass, more preferably 20 parts by mass to 40 parts by mass based on 100 parts by mass of the total amount of the nickel component and the first proton conductor. When the amount of the pore-forming material is within the range, the porosity of the anode can be more easily increased.

The mixture may contain a metal compound other than the nickel component or the first proton conductor, as needed. Preferred examples of the metal compound include oxides and carbonates. Examples of a metal contained in the metal compound include the metals in groups 2 and 4 of the periodic table. Specific examples of the metal compound include barium oxide, barium carbonate, cerium oxide, zirconium oxide, and yttrium oxide. These metal compounds may be used alone or in combination of two or more.

The mixture may further contain a binder. In the case of using the binder, the formability of the mixture is easily increased. Examples of the binder include known materials used for electrodes of SOFCs, for example, polymers and wax. Examples of polymers include cellulose ether such as ethyl cellulose, vinyl acetate resins, and acrylic resins. Vinyl acetate resins include saponified vinyl acetate resins such as poly(vinyl alcohol). An example of wax is paraffin wax. From the viewpoint of easily forming the article, the amount of the binder may be, for example, 1 part by mass to 15 parts by mass or 3 parts by mass to 10 parts by mass based on 100 parts by mass of the total amount of the nickel component and the first proton conductor.

The mixture may contain a dispersion medium such as water or an organic solvent, as needed. Examples of the organic solvent include hydrocarbon such as toluene, alcohols such as ethanol and isopropanol, and carbitols such as butyl carbitol acetate. These dispersion media may be used alone or in combination of two or more.

The mixture may contain an additive such as a surfactant and/or a deflocculant, as needed. An example of the deflocculant used is a polycarboxylic acid.

(Step B2)

In the case of forming the intermediate layer, in the step B2, a coating film b2 to be formed into a precursor of the intermediate layer is formed on one main surface of the green body obtained in the step A. The coating film b2 can be formed by applying a paste containing constituents (for example, a nickel element and the third proton conductor) of the intermediate layer to the one main surface of the green body. The formation of the coating film can be performed with a known coater or by a known method such as screen printing.

The source of the nickel element can be appropriately selected from the nickel components exemplified in Step A.

Although the pore-forming material as exemplified in the step A may be added to the paste, preferably, no pore-forming material is added thereto because the intermediate layer preferably has a low porosity $P_i$. From the same point of view, if the pore-forming material is added, the amount of the pore-forming material is preferably 5 parts or less by mass or 1 part or less by mass based on 100 parts by mass of the total amount of the nickel component and the third proton conductor.

The paste may further contain the metal compound exemplified in Step A.

The paste may further contain a binder. The binder can be appropriately selected from those exemplified in Step A. From the viewpoint of easily forming the coating film, the amount of the binder based on 100 parts by mass of the total amount of the nickel component and the third proton conductor can be appropriately selected in the range of the amount of the binder based on 100 parts by mass of the total amount of the nickel component and the first proton conductor described in Step A.

The paste can contain a dispersion medium, as needed. The paste may contain an additive such as a surfactant and/or a deflocculant, as needed. Examples of the dispersion medium and the additive include those exemplified in Step A.

The amount of the paste applied can be appropriately adjusted in such a manner that the thickness of the intermediate layer obtained by sintering the coating film is within the foregoing range.

After the coating film is formed, drying treatment may be performed, as needed.

The amount of the paste applied can be appropriately adjusted in such a manner that the thickness of the intermediate layer obtained by sintering the coating film is in the range of, for example, 0.5 μm to 10 μm, preferably 1 μm to 5 μm.

When the thickness of the intermediate layer is within this range, the high porosity of the anode is easily and effectively used while the leakage of the fuel and the oxidant is inhibited.

(Step B1)

In the step B1, the coating film b1 to be formed into a precursor of the solid electrolyte layer is formed on the one main surface of the green body. When the intermediate layer is not formed, the coating film b1 is formed on the one main surface of the green body obtained in the step A. When the intermediate layer is formed, the coating film b1 is formed on an exposed surface of the coating film b2 obtained in the step B2.

The coating film b1 can be formed by applying the paste containing constituents (for example, the second proton conductor) of the solid electrolyte layer to the one main surface of the green body. The formation of the coating film can be performed with a known coater or by a known method such as screen printing.

The paste may further contain the metal compound exemplified in Step A.

The paste may further contain a binder. The binder can be appropriately selected from those exemplified in Step A. From the viewpoint of easily forming the coating film, the amount of the binder may be, for example, 10 parts by mass to 300 parts by mass or 100 parts by mass to 200 parts by mass based on 100 parts by mass of the second proton conductor.

The paste can contain a dispersion medium, as needed. The paste may contain an additive such as a surfactant and/or a deflocculant, as needed. Examples of the dispersion medium and the additive include those exemplified in Step A.

The amount of the paste applied can be appropriately adjusted in such a manner that the thickness of the solid electrolyte layer obtained by sintering the coating film is within the foregoing range.

After the coating film is formed, drying treatment may be performed, as needed.

(Debinding Step)

In the case where the binder is used in the step A, the step B1, and/or the step B2, a debinding step is preferably performed at an appropriate stage after each step and before the step C. In the debinding step, the binder contained in the green body and the coating film is removed by heating. The pore-forming material contained in the green body also disappears at a heating temperature in the debinding step to form pores. The debinding step may be performed after, for example, the step A, the step B2, and the step B 1. Alternatively, the binder and the pore-forming material contained in the green body and the coating film can be removed by performing debinding treatment once after the step B 1.

The heating in the debinding step can be performed at a temperature at which the binder and the pore-forming material can be removed by, for example, decomposition and at which the co-sintering of the nickel component and the perovskite oxide does not proceed. From this point of view, the heating temperature can be selected, depending on the types of binder and pore-forming material, and may be, for example, 450° C. to 800° C., 500° C. to 800° C., or 700° C. to 800° C.

(Step C)

In the step C, the green body obtained in the step B1 is fired. By performing the step C, the green body is converted into the anode, and the coating film b1 is converted into the solid electrolyte layer. This provides the electrolyte layer-anode assembly in which the anode and the solid electrolyte layer are integrated with each other. When the coating film b2 is formed, in the step C, the coating film b2 is converted into the intermediate layer, which is integrated with the anode and the solid electrolyte layer to provide the electrolyte layer-anode assembly.

In the step C, it is important to perform sintering at 1,200° C. to 1,350° C. When the sintering at the temperature is performed, although the first proton conductor reacts with the nickel component to form a liquid phase, excessive shrinkage of a sintered product at the anode is inhibited, thereby resulting in a high porosity of the anode. The sintering at the temperature enables sintering in the anode, the intermediate layer, and the solid electrolyte layer to proceed sufficiently, thereby providing the dense intermediate layer and the dense solid electrolyte layer. From the viewpoint of increasing the degree of sintering to increase the conductivity of the anode, the sintering is preferably performed at a temperature of 1,250° C. to 1,350° C. The sintering at the temperature can also enhance the mechanical strength of the anode.

The sintering is preferably performed in an oxygen atmosphere and may be performed in air. The sintering can be performed at normal pressure or under pressure.

In the step C, for example, a composite oxide of a proton conductor and a nickel oxide such as NiO serving as a catalyst is formed in the anode and the intermediate layer. The co-sintering in the anode and the intermediate layer proceeds sufficiently to reduce the resistance, improving the power generation performance. At the anode of the SOFC, a reaction (the oxidation reaction of the fuel) in which the fuel such as hydrogen supplied is oxidized to form protons and electrons can be performed. The solid electrolyte layer of the SOFC has the function of conducting only the protons formed at the anode to the cathode.

(Cathode)

The cathode has a porous structure capable of adsorbing, dissociating, and ionizing an oxygen molecule. At the cathode, a reaction between the protons conducted through the solid electrolyte layer and oxygen ions (the reduction reaction of oxygen) occurs. The oxygen ions are formed by the dissociation of the oxidant (oxygen) introduced from the oxidant channel.

As a material for the cathode, for example, known materials used for cathodes of fuel cells can be used. Among these, compounds containing lanthanum and having a perovskite structure (for example, ferrite, manganite, and/or cobaltite) are preferred. More preferably, these compounds further contain strontium. Specific examples thereof include lanthanum strontium cobalt ferrite (LSCF, $La_{1-x3}Sr_{x3}Co_{y1}Fe_{1-y1}O_{3\pm\delta}$, $0<x3<1$, $0<y1<1$, and $\delta$ is excess oxygen or an oxygen vacancy concentration), lanthanum strontium manganite (LSM, $La_{1-x4}Sr_{x4}MnO_{3\pm\delta}$, $0<x4<1$, and $\delta$ is excess oxygen or an oxygen vacancy concentration), and lanthanum strontium cobaltite (LSC, $La_{1-x5}Sr_{x5}CoO_{3+\delta}$, $0<x5<1$, and $\delta$ is excess oxygen or an oxygen vacancy concentration).

In these perovskite oxides, $\delta$ may be $0\leq\delta\leq0.15$.

The cathode can be formed by, for example, sintering the foregoing material. For example, a binder, an additive, and/or a dispersion medium may be used together with the foregoing material, as needed.

From the viewpoint of promoting the reaction between the protons and oxygen ions, the cathode may contain a catalyst such as Pt. When the catalyst is contained, the cathode can be formed by mixing the catalyst with the foregoing material and sintering the mixture.

The thickness of the cathode may be, but is not particularly limited to, about 5 μm to about 40 μm.

Figure 1:
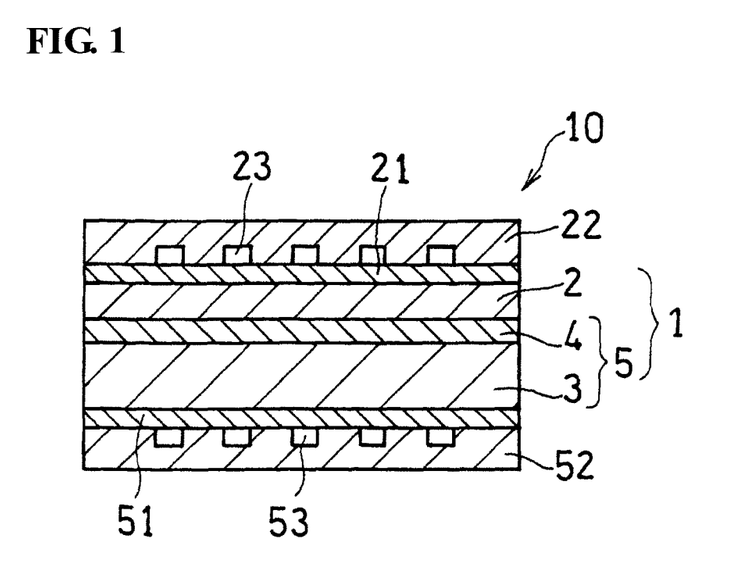
FIG. 1 is a schematic cross-sectional view illustrating an SOFC including an electrolyte layer-anode assembly according to an embodiment of the present invention.

FIG. 1 is a schematic cross-sectional view illustrating an SOFC according to an embodiment of the present invention.

A solid oxide fuel cell 10 includes a cell structure 1, a separator 22 including oxidant channels 23 to supply an oxidant to a cathode 2 of the cell structure 1, and a separator 52 including fuel channels 53 to supply a fuel to an anode 3. In the solid oxide fuel cell 10, the cell structure 1 is held between the cathode-side separator 22 and the anode-side separator 52.

The cell structure 1 includes the cathode 2, the anode 3, and a solid electrolyte layer 4 provided therebetween. The anode 3 and the solid electrolyte layer 4 are integrated with each other to provide an electrolyte layer-anode assembly 5.

The oxidant channels 23 of the cathode-side separator 22 are arranged so as to face the cathode 2 of the cell structure 1. The fuel channels 53 of the anode-side separator 52 are arranged so as to face the anode 3.

The oxidant channels 23 have oxidant inlets into which the oxidant flows and oxidant outlets that eject, for example, water formed by reaction and an unused oxidant (all not illustrated). An example of the oxidant is an oxygen-containing gas. The fuel channels 53 have fuel-gas inlets into which a fuel gas flows and fuel-gas outlets that eject, for example, unused fuel and $H_2O$, $N_2$, and $CO_2$ formed by reaction (all not illustrated). Examples of the fuel gas include gases containing hydrogen gas, methane gas, ammonia gas, and carbon monoxide gas.

The fuel cell 10 may include a cathode-side current collector 21 arranged between the cathode 2 and the cathode-side separator 22 and an anode-side current collector 51 arranged between the anode 3 and the anode-side separator 52. The cathode-side current collector 21 functions to collect a current and to diffusively supply an oxidant gas introduced through the oxidant channels 23 to the cathode 2. The anode-side current collector 51 functions to collect a current and to diffusively supply a fuel gas introduced through the fuel channels 53 to the anode 3. Thus, the current collectors preferably have structures having sufficient air-permeability. In the solid oxide fuel cell 10, the current collectors 21 and 51 are not necessarily provided.

Figure 2:
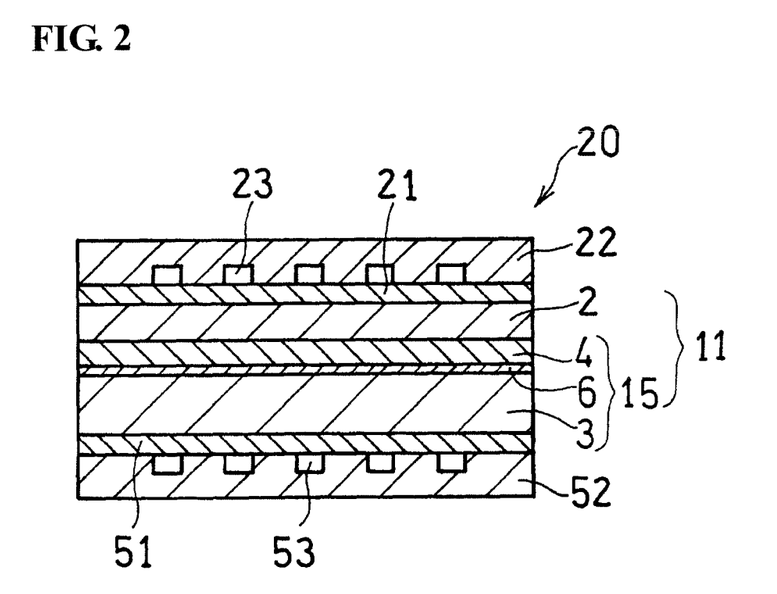
FIG. 2 is a schematic cross-sectional view illustrating an SOFC including an electrolyte layer-anode assembly according to another embodiment of the present invention.

FIG. 2 is a schematic cross-sectional view illustrating an SOFC according to another embodiment of the present invention. The SOFC illustrated in FIG. 2 has the same structure as in FIG. 1, except that the cell structure includes an intermediate layer provided between the anode and the solid electrolyte layer.

A solid oxide fuel cell 20 includes a cell structure 11, the separator 22 including the oxidant channels 23 to supply an oxidant to the cathode 2 of the cell structure 11, and the separator 52 including the fuel channels 53 to supply a fuel to the anode 3. The cell structure 11 includes the cathode 2, the anode 3, and the solid electrolyte layer 4 provided therebetween. An intermediate layer 6 is provided between the anode 3 and the solid electrolyte layer 4. The anode 3, the intermediate layer 6, and the solid electrolyte layer 4 are integrated to provide an electrolyte layer-anode assembly 15.

The SOFC includes the solid electrolyte layer containing the perovskite oxide having proton conductivity and thus can be operated in an intermediate temperature range lower than 700° C., preferably about 400° C. to about 600° C.

(Separator)

In the case where multiple cell structures are stacked to provide an SOFC, for example, the cell structure 1, the cathode-side separator 22, and the anode-side separator 52 are stacked as one unit. The multiple cell structures 1 may be connected together in series using, for example, a separator including gas channels (oxidant channels and fuel channels) on both sides.

Examples of a material for the separator include heat-resistant alloys such as stainless steels, nickel-based alloys, and chromium-based alloys in view of electron conductivity and heat resistance. Among these, stainless steels are preferred because of their low cost. In the PCFC, the operating temperature is about 400° C. to about 600° C.; thus, stainless steel can be used as a material for the separator.

(Current Collector)

Examples of a structure for each of the cathode-side current collector and the anode-side current collector include porous metal bodies, metal meshes, perforated metals, and expanded metals containing, for example, silver, silver alloys, nickel, and nickel alloys. Of these, porous metal bodies are preferred in view of lightweight properties and air-permeability. In particular, porous metal bodies having a three-dimensional mesh-like structure are preferred. The three-dimensional mesh-like structure refers to a structure in which metal rods or metal fibers constituting a porous metal body are three-dimensionally connected together to form a network. Examples thereof include sponge-like structures and nonwoven fabric-like structures.

The porous metal body can be formed by, for example, coating a resin porous body having continuous pores with the metal described above. After the metal coating treatment, the removal of the inner resin forms a cavity in the skeleton of the porous metal body to provide a hollow, porous metal body. "Celmet" composed of nickel (manufactured by Sumitomo Electric Industries Co., Ltd.), which is a commercially available porous metal body having the structure, can be used. The SOFC can be produced by a known method, except that the cell structure (in particular, the electrolyte layer-anode assembly) is used.

EXAMPLES

While the present invention will be specifically described below by examples and comparative examples, the present invention is not limited to these examples.

Example 1

(1) Production of Electrolyte Layer-Anode Assembly (a) NiO, $BaCe_{0.8}Y_{0.2}O_{3-\delta}$ (BCY, $\delta \approx 0.1$) serving as a first proton conductor, and a graphite powder (average particle size $D_{50}$: 20 μm) serving as a pore-forming material were mixed together with a binder (poly(vinyl alcohol)), a surfactant (polycarboxylic acid-based surfactant), and an appropriate amount of ethanol with a ball mill. The mixture was granulated. In this case, NiO and the first proton conductor were mixed together in a volume ratio of 70:30. The amounts of the pore-forming material, the binder, and the surfactant were 15 parts by mass, 10 parts by mass, and 0.5 parts by mass, respectively, based on 100 parts by mass of the total amount of NiO and the first proton conductor. The granulated mixture was uniaxially compacted to form a disk-like green body (diameter: 140 mm, thickness: 0.7 mm).

(b) NiO and $BaCe_{0.8}Y_{0.2}O_{3-\delta}$ (BCY, $\delta \approx 0.1$) serving as a third proton conductor were mixed together with a binder (poly(vinyl alcohol), a surfactant (polycarboxylic acid-based surfactant), and an appropriate amount of ethanol with a ball mill to prepare an intermediate layer paste. In this case, NiO and the third proton conductor were mixed together in a volume ratio of 70:30. The amounts of the binder and the surfactant were 10 parts by mass and 0.5 parts by mass, respectively, based on 100 parts by mass of the total amount of NiO and the third proton conductor. The resulting intermediate layer paste was applied to one main surface of the green body obtained in (a) by screen printing to form a coating film (coating film b2).

(c) $BaCe_{0.8}Y_{0.2}O_{3-\delta}$ (BCY, $\delta \approx 0.1$) serving as a second proton conductor, a binder (ethyl cellulose), a surfactant (polycarboxylic acid-based surfactant), and an appropriate amount of butyl carbitol acetate were mixed together to prepare an electrolyte paste. The amounts of the binder and the surfactant were 6 parts by mass and 0.5 parts by mass, respectively, based on 100 parts by mass of the second proton conductor. The electrolyte paste was applied to a surface of the coating film b2 obtained in (b) by screen printing to form a coating film (coating film b1).

(d) The green body obtained in (c) was subjected to debinding treatment by heating at 750° C. for 10 hours. Next, the green body was fired at 1,250° C. for 10 hours in an air atmosphere, thereby producing an electrolyte layer-anode assembly in which an anode, a solid electrolyte layer, and an intermediate layer provided therebetween were integrated together. The thickness of each of the anode, the intermediate layer, and the solid electrolyte layer was measured from a cross-sectional image, captured with a scanning electron microscope (SEM), of the electrolyte layer-anode assembly in the thickness direction.

The thickness measurement was performed at 10 points for each layer. The measured values were averaged to determine the average thickness. The anode had an average thickness of 600 μm. The intermediate layer had an average thickness of 7 μm. The solid electrolyte layer had an average thickness of 20 μm.

(2) Production of Cell Structure

A cathode paste containing a $La_{0.6}Sr_{0.4}CO_{0.2}Fe_{0.8}O_{3-\delta}$ (LSCF, $\delta \approx 0.1$) powder, a surfactant (polycarboxylic acid-based surfactant), and an appropriate amount of a solvent (toluene and isopropanol) was prepared. The cathode paste was applied to a surface of the solid electrolyte layer of the assembly obtained in (1) and heated at 1,000° C. for 2 hours to form a cathode (thickness: 10 μm), thereby forming a cell structure.

(3) Production of SOFC

A platinum paste was applied to a surface of each of the cathode and the anode of the cell structure obtained in (2). Platinum meshes are attached thereto to form current collectors. A cathode-side separator that had oxidant channels and that was composed of stainless steel was stacked on the current collector on the side of the cathode. An anode-side separator that had fuel channels and that was composed of stainless steel was stacked on the current collector on the side of the anode. Thereby, an SOFC illustrated in FIG. 2 was produced.

(4) Evaluation

The resulting electrolyte layer-anode assembly or SOFC was evaluated as described below.

(a) Porosity of Each Layer of Assembly

The porosity (% by volume) of each of the layers of the assembly was determined on the basis of an image obtained by subjecting the SEM image of the cross section of the assembly immediately after the production in the thickness direction to binarization. Specifically, the total area of pores in a region having a length of 37 μm×a width of 57 μm of the binarized SEM image was determined. The proportion of the total area of the pores in the region was regarded as a proportion by volume and defined as the porosity. From the XRD spectrum of the anode of the assembly, the peak intensity $I_{Ni}$ of metallic Ni and the peak intensity $I_{NiO}$ of NiO were determined. The relative intensity ratio $I_{Ni}/I_{NiO}$ was calculated to be 0.1 or less.

(b) Open Circuit Voltage (OCV)

The alternating current impedance in an open circuit state was measured at an operating temperature of 600° C. to determine the OCV (V) of the SOFC.

Example 2 and Comparative Example 1

Electrolyte layer-anode assemblies were produced as in Example 1, except that in (d) of (1) in Example 1, the sintering temperature was changed as listed in Table 1. Cell structures and SOFCs were produced and evaluated as in Example 1, except that the resulting electrolyte layer-anode assemblies were used.

Example 3

An electrolyte layer-anode assembly was produced as in Example 1, except that the step (b) of Example 1 was not performed, that the electrolyte paste was applied to one main surface of the green body obtained in (a) to form the coating film b1 in the step (c), and that the sintering temperature was changed as described in Table 1. That is, in Example 3, no intermediate layer was formed. A cell structure and an SOFC were produced and evaluated as in Example 1, except that the resulting electrolyte layer-anode assembly was used.

Comparative Example 2

An electrolyte layer-anode assembly was produced as in Example 3, except that the amount of the pore-forming material was changed to 5 parts by mass based on 100 parts by mass of the total amount of NiO and the first proton conductor and that the sintering temperature was changed as described in Table 1. A cell structure and an SOFC were produced and evaluated as in Example 1, except that the resulting electrolyte layer-anode assembly was used.

Comparative Example 3

An electrolyte layer-anode assembly was produced as in Example 3, except that corn starch (average particle size $D_{50}$: 10 μm) was used as the pore-forming material and that the sintering temperature was changed as described in Table 1. A cell structure and an SOFC were produced and evaluated as in Example 1, except that the resulting electrolyte layer-anode assembly was used.

Table 1 lists the results of the examples and the comparative examples. In Table 1, A1 to A3 denote Examples 1 to 3, and B1 to B3 denote Comparative examples 1 to 3.

TABLE 1

| | Sintering temperature (° C.) | Pore-forming material Type | (parts by mass) | First proton conductor | Porosity of anode (% by volume) | OCV (V) |
|---|---|---|---|---|---|---|
| A1 | 1250 | graphite | 15 | BCY | 14 | 1.01 |
| A2 | 1350 | graphite | 15 | BCY | 13 | 1.05 |
| B1 | 1400 | graphite | 15 | BCY | 8 | 1.09 |
| A3 | 1200 | graphite | 15 | BCY | 15 | 0.80 |
| B2 | 1400 | graphite | 5 | BCY | 3 | 1.10 |
| B3 | 1400 | corn starch | 15 | BCY | 5 | 0.72 |

As listed in Table 1, the anode of each of the examples had a porosity of 10% or more by volume. Furthermore, in each of the examples, a relatively high open circuit voltage was obtained.

In the case of BCY, low porosities less than 10% by volume are obtained at a sintering temperature of 1,400° C. (Comparative examples 1 to 3). At a sintering temperature of 1,200° C., although the anode has a high porosity, the open circuit voltage tends to be low. Thus, in order to easily achieve a high open circuit voltage, preferably, the sintering temperature is higher than 1,200° C., for example, 1,250° C. or higher. Also in the case where corn starch is used in place of graphite, the same effects as in the examples are provided.

In the case where BZY and BZCY, which belong to the same crystal system, were used, the same effects as in the examples are provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The SOFC according to an embodiment of the present invention includes the anode having a high porosity and thus has high fuel utilization efficiency. Furthermore, the perovskite oxide is used as the solid electrolyte; thus, the SOFC is suitable for use in an intermediate operating temperature range lower than 700° C.

REFERENCE SIGNS LIST 1, 11 cell structure
2 cathode
3 anode
4 solid electrolyte layer
5, 15 electrolyte layer-anode assembly
6 intermediate layer
10, 20 solid oxide fuel cell
21, 51 current collector
22, 52 separator
23 oxidant channel
53 fuel channel

The invention claimed is:

1. A solid oxide fuel cell comprising a cell structure including a cathode, an anode, a protonically conductive solid electrolyte layer provided between the cathode and the anode, an oxidant channel to supply an oxidant to the cathode, and a fuel channel to supply a fuel to the anode,
wherein the solid electrolyte layer and the anode are integrated with each other to provide an electrolyte layer-anode assembly,
the anode contains a nickel element and a first proton conductor,
the first proton conductor is composed of a first perovskite oxide having proton conductivity,
the first perovskite oxide has an $AXO_3$-type crystal structure, an A-site containing Ba, an X-site containing Y and at least one selected from the group consisting of Zr and Ce,
the nickel element is at least partially in the form of NiO,
the anode has a porosity $P_a$ of 10% or more by volume when $I_{Ni}/I_{NiO} \leq 0.1$, where $I_{Ni}/I_{NiO}$ denotes a relative intensity ratio of a peak intensity $I_{Ni}$ of metallic Ni to a peak intensity $I_{NiO}$ of the NiO in an X-ray diffraction spectrum of the anode, and
the solid electrolyte layer has a porosity $P_s$ of 0.5% or less by volume.

2. The solid oxide fuel cell according to claim 1, wherein the porosity $P_a$ is 10% by volume to 25% by volume.

3. The solid oxide fuel cell according to claim 1, wherein the solid electrolyte layer contains a second proton conductor,
the second proton conductor is composed of a second perovskite oxide having proton conductivity,
the second perovskite oxide has an $AXO_3$-type crystal structure, an A-site containing Ba, an X-site containing Y and at least one selected from the group consisting of Zr and Ce.

4. The solid oxide fuel cell according to claim 1, wherein the electrolyte layer-anode assembly further includes an intermediate layer provided between the solid electrolyte layer and the anode,
the intermediate layer contains a nickel element and a third proton conductor, and
the intermediate layer has a porosity $P_i$ lower than the porosity $P_a$.

5. The solid oxide fuel cell according to claim 4, wherein the porosity $P_i$ is 5% or less by volume.

6. The solid oxide fuel cell according to claim 4, Wherein the third proton conductor is composed of a third perovskite oxide having proton conductivity, and
the third proton conductor has an $AXO_3$-type crystal structure, an A-site containing Ba, an X-site containing Y and at least one selected from the group consisting of Zr and Ce.

* * * * *